(12) United States Patent
Suzuki et al.

(10) Patent No.: US 12,505,415 B2
(45) Date of Patent: Dec. 23, 2025

(54) DATA TRADING SYSTEM

(71) Applicant: Plat'Home Co., Ltd., Tokyo (JP)

(72) Inventors: Tomoyasu Suzuki, Tokyo (JP); Daisuke Ogawa, Tokyo (JP); Toshiya Goto, Tokyo (JP)

(73) Assignee: Plat'Home Co., Ltd., Tokyo (JP)

( * ) Notice: Subject to any disclaimer, the term of this patent is extended or adjusted under 35 U.S.C. 154(b) by 5 days.

(21) Appl. No.: 18/000,484

(22) PCT Filed: Jun. 2, 2021

(86) PCT No.: PCT/JP2021/021070
§ 371 (c)(1),
(2) Date: Dec. 1, 2022

(87) PCT Pub. No.: WO2021/246460
PCT Pub. Date: Dec. 9, 2021

(65) Prior Publication Data
US 2023/0222457 A1    Jul. 13, 2023

(30) Foreign Application Priority Data

Jun. 2, 2020 (JP) ................................ 2020-096364

(51) Int. Cl.
*G06Q 30/02* (2023.01)
*G06Q 20/06* (2012.01)
(Continued)

(52) U.S. Cl.
CPC ............. *G06Q 20/06* (2013.01); *G16Y 20/20* (2020.01); *G16Y 40/35* (2020.01); *G06Q 2220/00* (2013.01)

(58) Field of Classification Search
CPC ............... G06Q 20/06; G06Q 2220/00; G06Q 30/0201; G06Q 30/06; G06Q 40/04;
(Continued)

(56) References Cited

U.S. PATENT DOCUMENTS

| 8,489,463 B2 | 7/2013 | Sen et al. |
| 10,102,265 B1 | 10/2018 | Madisetti et al. |

(Continued)

FOREIGN PATENT DOCUMENTS

| JP | 2018-018348 A | 2/2018 |
| JP | 2018-081464 A | 5/2018 |

(Continued)

OTHER PUBLICATIONS

Papadodimas, George "Implementation of Smart Contracts for Blockchain based IoT" 2018 9th Int'l Conf on Network of the Future (NOF) Nov. 19, 2018 pp. 61-68 (Year: 2018).*

(Continued)

*Primary Examiner* — Breffni Baggot
(74) *Attorney, Agent, or Firm* — Studebaker Brackett PLLC

(57) ABSTRACT

The present invention provides an IoT data trading system including: a data transport unit capable of sending data to a predetermined counterparty; a data transaction unit that executes a trading contract of data; and an IoT device that provides IoT data, wherein the data transaction unit instructs, based on a buy offer of the IoT data issued from a predetermined account and a sell offer issued from an account of the IoT device, the data transport unit to send the IoT data from the IoT device to a data provider which owns the account from which the buy offer is issued, and imparts a monetary value of the sent IoT data to the account of the IoT device.

16 Claims, 9 Drawing Sheets

EXAMPLE OF DEVICE OF PRESENT EMBODIMENT (AIR CONDITIONER)

(51) Int. Cl.
  *G16Y 20/20* (2020.01)
  *G16Y 40/35* (2020.01)
(58) Field of Classification Search
  CPC ........ G06Q 20/14; G06Q 50/10; G16Y 20/20; G16Y 40/35; G16Y 20/00; H04L 2209/56; H04L 2209/805; H04L 9/50; H04L 9/3213
  See application file for complete search history.

(56) References Cited

U.S. PATENT DOCUMENTS

| | | | |
|---|---|---|---|
| 10,535,207 | B1 | 1/2020 | Goluguri et al. |
| 11,847,646 | B2 | 12/2023 | Gorilovsky et al. |
| 2016/0260171 | A1 | 9/2016 | Ford et al. |
| 2017/0287090 | A1 | 10/2017 | Hunn et al. |
| 2017/0308596 | A1* | 10/2017 | Chen ................. G06Q 30/0601 |
| 2018/0039785 | A1 | 2/2018 | Naqvi et al. |
| 2018/0096412 | A1 | 4/2018 | Scott-Nash et al. |
| 2018/0139056 | A1 | 5/2018 | Imai et al. |
| 2018/0288022 | A1 | 10/2018 | Madisetti et al. |
| 2018/0336515 | A1 | 11/2018 | Mehring et al. |
| 2018/0343126 | A1 | 11/2018 | Fallah et al. |
| 2019/0012662 | A1 | 1/2019 | Krellenstein et al. |
| 2019/0013948 | A1 | 1/2019 | Mercuri et al. |
| 2019/0036887 | A1 | 1/2019 | Miller |
| 2019/0050854 | A1 | 2/2019 | Yang et al. |
| 2019/0137988 | A1 | 5/2019 | Cella et al. |
| 2019/0244306 | A1 | 8/2019 | Kursun |
| 2019/0349733 | A1 | 11/2019 | Nolan et al. |
| 2019/0361917 | A1 | 11/2019 | Tran et al. |
| 2020/0026785 | A1 | 1/2020 | Patangia et al. |
| 2020/0043007 | A1* | 2/2020 | Simons ................. H04L 9/3236 |
| 2020/0051081 | A1 | 2/2020 | Valecha et al. |
| 2020/0058007 | A1* | 2/2020 | Karame ................. H04L 9/0637 |
| 2020/0143471 | A1 | 5/2020 | Jackson et al. |
| 2020/0167770 | A1 | 5/2020 | Kurian et al. |
| 2021/0248156 | A1 | 8/2021 | Egami et al. |
| 2022/0058647 | A1* | 2/2022 | Suzuki ................. G06Q 30/08 |
| 2022/0198562 | A1* | 6/2022 | Cella ................. G06Q 40/04 |
| 2024/0078574 | A1* | 3/2024 | Doran ................. G06Q 20/123 |

FOREIGN PATENT DOCUMENTS

| | | | |
|---|---|---|---|
| JP | 6501029 | B1 | 4/2019 |
| JP | 6694048 | B1 | 5/2020 |
| JP | 2020-188446 | A | 11/2020 |

OTHER PUBLICATIONS

Extended European Search Report issued in EP Patent Application No. 21 81 6975.3, mailed on Oct. 13, 2023.
Georgios Papadodimas et al., "Implementation of Smart Contracts for Blockchain Based IoT Applications," 2018 9th International Conference on the Network of the Future (NOF), IEEE, Nov. 19, 2018, pp. 60-67, XP033490496.
Yu Zhang et al., "An IoT Electric Business Model Based on the Protocol of Bitcoin," 2015 18th International Conference on Intelligence in Next Generation Networks, IEEE, Feb. 17, 2015, pp. 184-191, XP032758446.
Dominic Wörner et al., "When Your Sensor Earns Money," Pervasive and Ubiquitous Computing, ACM, 2 Penn Plaza, Suite 701 New York NY 10121-0701 USA, Sep. 13, 2014, pp. 295-298, XP058055434.
Wood Gavin, "Ethereum: A Secure Decentralised Generalised Transaction Ledger, EIP-150 Revision," Jan. 1, 2014, pp. 1-32, XP055787779, URL: http://gavwood.com/Paper.pdf [retrieved on Mar. 19, 2021].
Andreas M. Antonopoulos et al., "Mastering Ethereum," Mastering Ethereum: Building Smart Contracts and DApps, Jan. 1, 2018, XP055880605, ISBN: 978-1-4919-7194-9, URL: https://dl.ebooksworld.ir/motoman/Mastering_Ethereum_Andreas.M.Antonopoulos.www.EBooksWorld.ir.pdf [retrieved on Jan. 18, 2022].
Konstantinos Christidis et al., "Blockchains and Smart Contracts for the Internet of Things," IEEE Access, Sep. 13, 2014, pp. 2292-2303, vol. 4, XP011613134, DOI: 10.1109/ACCESS.2016.2566339 [retrieved on Jun. 3, 2016].
International Search Report issued in PCT/JP2021/021070; mailed Jul. 20, 2021.
Crypto Crowd Japan, decoin.io, "Always evolving DECO IN Exchange now!" Nov. 5, 2019 (accession date), No. 20, pp. 12-13, ISSN 2434-2211, p. 13, left column, lines 1-9, Published on Jan. 1, 2019.
Chuanwen Dong et al., "From the Digital Internet to the Physical Internet: A Conceptual Framework with a Stylized Network Model" Logistics Platform, Logi biz, vol. 20, No. 2, pp. 37-43, p. 39, table 1, Published on May 1, 2020.
Tetsuo Furuichi et al., "Proposal of IoT System with Smart Contract", IPSJ SIG Technical Report: Consumer Devices & Systems, vol. 2018-CDS-022 [online], pp. 1-8, ISSN 2188-8604, entire text, all drawings, Published on May 24, 2018.
"Hyperledger Fabric Docs", [online], Mar. 18, 2018, [retrieved on Jun. 12, 2019], Internet<URL:https://web.archive.org/web/20180318052829/https://hyperledger-fabric.readthedocs.io/en/release-1.0/channels.html>, entire text, all drawings, pp. 1.
Yoshihama, Sachiko et al.; "Protection of Integrity and Privacy on Distributed Ledger Technologies"; Proceedings of Computer Security Symposium 2017; Oct. 23-25, 2017; pp. 680-687; CD-ROM.
Ramachandran, Gowri Sankar et al.; "Blockchain for the IoT: Opportunities and Challenges"; May 8, 2018; arXiv:1805.02818v1 [cs.DC], total 5 pages.
An Office Action; "Notice of Reasons for Refusal," mailed by the Japanese Patent Office on Sep. 3, 2019, in JP Patent Application No. 2018-238786; with English language translation.
K. R. Özyilmaz, M. Dogan and A. Yurdakul, "IDMoB: IoT Data Marketplace on Blockchain," 2018 Crypto Valley Conference on Blockchain Technology (CVCBT), Zug, Switzerland, 2018, pp. 11-19, doi: 10.1109/CVCBT.2018.00007. (Year 2018).
C. Jiang, L. Gao, L. Duan and J. Huang, "Scalable Mobile Crowdsensing via Peer-to-Peer Data Sharing," in IEEE Transactions on Mobile Computing, vol. 17, No. 4, pp. 898-912, Apr. 1, 2018, doi: 10.1109/TMC.2017.2743718. (Year: 2018).
An Office Action mailed by the United States Patent and Trademark Office on Oct. 26, 2023, in U.S. Appl. No. 17/416,406.
L. C. C. De Biase, P. C. Calcina-Ccori, G. Fedrecheski, G. M. Duarte, P.S.S. Rangel and M. K. Zuffo, "Swarm Economy: A Model for Transactions in a Distributed and Organic IoT Platform," https://ieeexplore.ieee.org document/8572758, pp. 4561-4572, Print Publication Date: Dec. 10, 2018 (Year: 2018).
K. Özyilmaz, and A. Yurdakul, "Designing a blockchain-based IoT infrastructure with Ethereum, Swarm and LoRa," https:// www.researchgate.net/publication/327790416_Designing_a_blockchain-based_IoT_infrastructure_with_Ethereum_Swarm_and_LoRa (Year: 2018), pp. 1-6.
L. C. C. De Biase, P. C. C. Ccori, G. Fedrecheski, D. Navarro, R. Y. Lino and M. K. Zuffo, "Swarm Minimum Broker: an approach to deal with the Internet of Things heterogeneity," 2018 Global Internet of Things Summit (GIoTS), Bilbao, Spain, 2018, pp. 1-6, doi: 10.1109/GIOTS.2018.8534433. (Year: 2018).
Ihartikk.github.io, "NaïveCoin," retrieved from https://web.archive.org/web/20181112211128/http://Ihartikk.github.io:80/ on Nov. 12, 2018 and before. (Year: 2018), total 23 pages.
An Office Action mailed by the United States Patent and Trademark Office on Jun. 20, 2024, in U.S. Appl. No. 17/416,406.
B. Yu, J. Wright, S. Nepal, L. Zhu, J. Liu and R. Ranjan, "IoTChain: Establishing Trust in the Internet of Things Ecosystem Using Blockchain," in IEEE Cloud Computing, vol. 5, 2018, No. 4, pp. 12-23, Jul./Aug. 2018, doi: 10.1109/MCC.2018.043221010 (Year: 2018).
M. Conoscenti, A. Vetrò and J.C. De Martin, "Blockchain for the Internet of Things: A systematic literature review," 2016 IEEE/ACS 13th International Conference of Computer Systems and Applications (AICCSA), Agadir, Morocco, 2016, pp. 1-6, doi: 10.1109/AICCSA.2016.7945805 (Year: 2016).

(56) References Cited

OTHER PUBLICATIONS

An Office Action mailed by the United States Patent and Trademark Office on Feb. 19, 2025, which corresponds to U.S. Appl. No. 17/416,406.

* cited by examiner

FIG. 6

ADDRESS = PUBLIC KEY

PTPF Address:0xd9d64b7DC034fAfDbA5DC2902875A67b5d586420
Ptx:  0.3
AC   Address: 0x8a5E2a6343108bABEd07899510fb42297938D41F
Ptx:  0.2
DB   Address: 0x938781b9796aeA6376E40ca158f67Fa89D5d8a18
Ptx:  0.1
d-ogawa:ptpf$ ADDRESS: ADDRESS ON BLOCKCHAIN
    = DLT:ADDRESS ON Quarum

FIG. 7

DO SCREEN d-ogawa:ptpf$ truffle exec check_ptx.js -
Using network "DO".

Account: 0xd9d64b7DC034fAfDbA5DC2902875A67b5d586420
Ptx: 0.0
d-ogawa:ptpf$ truffle exec check_ptx.js -
Using network "DO".                    ←——————— A Account: 0x8a5E2a6343108bABEd07899510fb42297938D41F
Ptx: 10.0                              ←——————— B
d-ogawa:ptpf$ truffle exec do.js test1 --
Using network "DO".

Getting deployed version of Ac···
Metadata ···test
Price ···1                             ←——————— C
0xd9d64b7DC034fAfDbA5DC2902875A67b5d586420
10
d-ogawa:ptpf$ truffle exec check_ptx.js -
Using network "DO".

Account: 0x8a5E2a6343108bABEd07899510fb42297938D41F
Ptx: 10.4                              ←——————— D
d-ogawa:ptpf$

FIG. 8

SP SCREEN d-ogawa:ptpf$ truffle exec check_ptx.js -
Using network "SP".

Account: 0xcad64b7DC034fAfDbA5DC2902875A67b5d586420
Ptx: 0.0
d-ogawa:ptpf$ truffle exec check_ptx.js -
Using network "SP".    ←──────── E Account: 0xcad64b7DC034fAfDbA5DC2902875A67b5d586420
Ptx: 10.0    ←──────── F
d-ogawa:ptpf$ truffle exec check_ptx.js -
Using network "SP".

Getting deployed version of Db…
Metadata …test
Price …1    ←──────── G
0xcad64b7DC034fAfDbA5DC2902875A67b5d586420
10
d-ogawa:ptpf$ truffle exec check_ptx.js -
Using network "SP".

Account: 0xcad64b7DC034fAfDbA5DC2902875A67b5d586420
Ptx: 9.0    ←──────── H
d-ogawa:ptpf$

EXAMPLE OF CONVENTIONAL DEVICE (AIR CONDITIONER)

DATA TRADING SYSTEM

TECHNICAL FIELD

The present invention relates to a data trading system including an IoT device for providing IoT data, in particular, an automatic money-collection IoT device that can automatically acquire a price associated with the provision of the IoT data.

BACKGROUND ART

In recent years, the IoT (Internet of Things), which is the Internet for objects, has been widely used. Data obtained by sensors on the IoT are used for various purposes. A device that provides IoT data is called an IoT device.

FIG. 9 shows an example of a configuration of a conventional IoT device. The example shown in FIG. 9 is an example of a configuration diagram in a case where the IoT device is ac air conditioner (hereinafter, referred to as an air conditioner 1010). As shown in FIG. 9, the air conditioner 1010 includes a motion sensor 1012, a temperature sensor 1014, a dust sensor 1016, and a data generator 1018. In FIG. 9, a configuration related to cooling/heating function of the air conditioner 1010 is a common configuration, and thus is not be shown.

The motion sensor 1012 detects whether there is a person in a place where the air conditioner 1010 is installed. The temperature sensor 1014 detects an ambient temperature in the place where the air conditioner 1010 is installed. The dust sensor 1016 detects a density of dust at the place. These sensors are conventionally known (used), and a detailed description thereof will not be given herein.

The data generator 1018 is configured to control these sensors, acquire IoT data from these sensors, and provide the IoT data to an external device. The data generator 1018 may be configured using a control device generally called a microcomputer, for example. In the case of using the microcomputer, the data generator 1018 preferably includes a storage device that stores a program in which an operation of the microcomputer is written, a processor (for example, a CPU) that executes the program stored in the storage device, an interface for connecting the sensors, and a communication device for providing the IoT data to the external device. The interface may be an analog interface or a digital interface depending' on characteristics of the sensors. The communication device may be configured as a so-called communication interface, or may be a device connected to the Internet or Wi-fi.

The conventional IoT device, such as the conventional air conditioner 1010 shown in FIG. 9 can generate IoT data. However, the generated IoT data is data that has utility values and economic values. Therefore, in order to utilize such IoT data, a mechanism is required that smoothly converts the IoT data into a monetary value (currency). In other words, unless a mechanism for smoothly converting the IoT data into money is implemented, efficient utilization of the IoT data is considered to become difficult.

Since the conventional IoT device merely generates the IoT data, the mechanism for converting the IoT data into a currency described above is dependent on external equipment. For example, a mechanism is generally used in which a server that stores the IoT data is externally provided, and a fee is charged each time the IoT data is downloaded from the server.

However, while such a "charge for download" mechanism, is considered to be able to sufficiently cope with static data, the IoT data is real-time data such as temperature, humidity, etc. and an economic value thereof is fluctuating. For example, earthquake data is almost worthless when an earthquake does not occur, but extremely increases in importance once an earthquake occurs. If an electric power company is able to know power consumption of home appliances and data of the motion sensor 1012 in real time, it can reflect them to control of an electric power system in real time, can generate power in a planned manner, and thus can also contribute to the improvement of global environments. Therefore, there is a strong demand for a mechanism for quickly and automatically converting IoT data having such characteristics into a currency (monetary value).

For example, as will be described below, a technique is disclosed in Patent Document 1 in which when target data is subjected to preprocessing, a preprocessing ID of the preprocessed data is assigned to the target data. It is described that due to this technique, a new competitive market can be established for the purpose of distributing a price to a business operator who performs the preprocessing on data.

Patent Document 1: Japanese Patent No. 6501029

DISCLOSURE OF THE INVENTION

Problems to be Solved by the Invention

In the technique disclosed in Patent Document 1, a mechanism is realized in which the preprocessing is identified by an ID and the price is given to the business operator, whereby the preprocessing is naturally required. In other words, it is clear that if there is no processing equivalent to the preprocessing, it is difficult to associate the monetary value with the target data. Therefore, a mechanism that automatically associates a monetary value with target data, for example, IoT data itself will make it possible to easily construct a mechanism that provides a fair price to a data provider. When such a mechanism is realized, the provider of the IoT data can automatically acquire the monetary value, and as a result, it is expected that the disclosure and use of IoT data will be further promoted.

In view of the foregoing circumstances, the present invention is to realise a mechanism capable of automatically associating a monetary value with IoT data, to provide a data trading system for IoT data and a technique, and to provide a technique related to the IoT data trading system.

Means for Solving the Problems (Basic Principle 1)

In order to achieve the object described above, the present inventors have conducted extensive research and have come up with a principle of accommodating nodes of a blockchain in a device (IoT device) for generating data. Here, the node of the blockchain may be called a "client" of the blockchain. In the description of the present invention and embodiments thereof, an example will be described in which a virtual currency is employed as a monetary value, and thus the node may be called a "virtual currency node". While the node of the blockchain can set up an account, whereby a virtual currency such as a so-called bitcoin is realized, the present inventors have found that using the account makes it possible to realize a mechanism in which monetary value (for example, a virtual currency such as the bitcoin) automatically stored in an account of (an owner of) an IoT device.

(Basic Principle 2)

Depending on the IoT device, there may be a case where it is not appropriate or is difficult) to accommodate a virtual currency node (client) in the IoT device. In such a case, an identifier called a device ID (asset ID) may be set for the IoT device, and an asset (for example, an asset token) corresponding to the device III) may be disposed on the blockchain. Further, the device ID (asset ID) may be a public key generated from a secret key.

(Applications)

It is conceivable that the present invention can be used for the following applications. For example, there is a possibility that the following devices as IoT devices can be realized.
  (a) A "laundry machine that earns more money as a user uses it more"
  (b) A "chair that earns more money as a user sits on it more"
  (c) An "air conditioner that earns more money as a user uses it more"
  (d) A "painting that earns more money as a user views it more" Further, there is a possibility to realize related techniques as follows, based on Basic Principle 1 and Basic Principle 2 described above.
  (e) A "mechanism that enables instant revenue sharing"
  (f) A "mechanism that guarantees reliability and accuracy of data, which is generated by a sensor and a device, by a third party"
  (g) A "mechanism that allows a user to clearly display an intention to use data"
  (h) A "mechanism that actually deposits money into a user's account during cash-back"

(Specific Configurations)

Specifically, the present invention employs the following configurations.

The present invention provides a data trading system (for example, a data trading system including a data transaction platform, a data transport platform 3002, and an air conditioner 1150 which will be described below) capable of functioning as an IoT data trading system including: a data transport unit (for example, a data transport platform 3002 to be described below) capable of setting a channel for data and sending the data to a predetermined counterparty, under control from an external device; a data transaction unit (for example, a data transaction platform 3000 to be described below) that preserves and manages a data trading contract using a blockchain and executes the data trading contract; and an IoT device (for example, an air conditioner 1110 or 1150 to be described below) that provides IoT data. The IoT device includes: one or more sensors (for example, a motion sensor 1012 to be described below) that generate IoT data; a data generator (for example, a data generator 1018 to be described below) that acquires data generated by one or more sensors and provides the data to an external device; and a device-side blockchain client (for example, a blockchain client 1120 to be described below) for the blockchain. The data transaction unit has two or more accounts for trading the IoT data, and executes the data trading contract between the accounts. The IoT device has an account in the data transaction unit. The data generator sends the IoT data generated by the sensors to the data transport unit, the account of the IoT device including the device-side blockchain client sends a sell offer of the IoT data to the data transaction unit. The data transaction unit instructs, based on a buy offer of the IoT data issued from a predetermined account and the sell offer issued from the account of the IoT device, the data transport unit to send the IoT data from the IoT device to a service provider (for example, an SP 108 to be described below) which owns the account from which the buy offer has been issued, and imparts a monetary value of the sent IoT data to the account of the IoT device.

The data trading system may further include: an acquisition unit (for example, an AC 104 to be described below) that issues a sell offer to the data transaction unit on behalf of an owner of the IoT device, the acquisition unit having an account in the data transaction unit; and a data broker (for example, a DB 110 to be described below) that issues a buy offer of data to the data transaction unit on behalf of a service provider that utilizes the data, the data broker having an account in the data transaction unit. The data transaction unit may instruct, based on a buy offer of the IoT data issued from the account of the data broker and the sell offer issued from the account of the acquisition unit, the data transport unit to send the IoT data from the IoT device to the service provider, on behalf of which the data broker has issued the but offer from the account of the data broker, and may distribute and impart a monetary value of the sent IoT data to the account of the IoT device, the account of the acquisition unit, the account of the data broker, and the account of the data transaction unit at a predetermined revenue ratio.

The present invention provides an IoT data trading system including: a data transport unit capable of setting a channel for data and sending the data to a predetermined counterparty, under control from an external device; a data transaction unit that preserves and manages a data trading contract using a blockchain and executes the data trading contract; and an IoT device that provides IoT data. The IoT device includes: one or more sensors that generate IoT data; a data generator that acquires data generated by the one or more sensors and provides the data to an external device; and a device ID storage unit (for example, a device ID 1022 to be described below) that stores a device ID of the IoT device. The data transaction unit may hold an asset token corresponding to the device ID. The data generator may send the IoT data generated by the sensors to the data transport unit, and an account of an owner of the asset token may send a sell offer of the IoT data to the data transaction unit. The data transaction unit may instruct, based on a buy offer of the IoT data issued from a predetermined account and the sell offer, the data transport unit to send the IoT data from the IoT device to the account from which the buy offer has been issued, and may impart a monetary value of the sent IoT data to the account of the owner of the asset token existing in the data transaction unit.

The data trading system may further include: an acquisition unit that issues a sell offer to the data transaction unit on behalf of an owner of the IoT device, the acquisition unit having an account in the data transaction unit; and a data broker that issues a buy offer of data to the data transaction unit on behalf of a service provider that utilizes the data, the data broker having an account in the data transaction unit. The data transaction an it may instruct, based on a buy offer of the IoT data issued from the account of the data broker and the sell offer issued from the account of the acquisition unit, the data transport unit to send the IoT data from the IoT device to the service provider, on behalf of which the data broker has issued the buy offer from the account of the data broker, and may distribute and impart a monetary value of the sent IoT data to the account of the owner of the asset token existing in the data transaction unit, the account of the acquisition unit, the account of the data broker, and the account of the data transaction unit at a predetermined revenue ratio.

The present invention provides a data trading system including: a data transport an it capable of setting a channel for data and sending the data to a predetermined counterparty, under control from an external device; a data transaction unit that preserves and manages a data trading contract using a blockchain and executes the data trading contract; an acquisition unit that issues a sell offer of data to the data transaction unit for a provider (for example, a DO 102 to be described below) that provides data; and a data broker that issues a buy offer of data to the data transaction unit for a service provider that utilizes data, the data transaction unit being configured to perform condition matching on the sell. offer and the buy offer, and cause the data transport unit to set the channel for sending the data from the provider to the service provider when the matching is established; and an IoT device including the provider and a sensor for obtaining the data to be provided by the provider, the sensor being configured to generate data as the IoT device operates, the provider being an account of the blockchain and being configured to provide the data generated by the sensor to the service provider.

The provider may have an account that holds a monetary value, the service provider may also have an account that holds a value, the data transport unit may send the data from the provider to the service provider, and the data transaction unit may transfer a monetary value corresponding to the data from the service provider to the provider.

The IoT device may be one selected from an electrical appliance, a mobile communication device, and an industrial machine.

The monetary value may be one selected from a virtual currency, a cryptocurrency, and electronic money.

The monetary value may be a cryptocurrency managed by the blockchain of the data transaction unit.

The present invention provides a data trading system including: a data transport unit capable of setting a channel for data and sending the data to a predetermined counterparty, under control from an external device; a data transaction unit that preserves and manages a data trading contract using a blockchain and executes the data trading contract; an acquisition unit that issues a sell offer of data to the data transaction unit for a provider that provides data; and a data broker that issues a buy offer of data to the data transaction unit for a service provider that utilizes data, the data transaction unit being configured to perform condition matching on the sell offer and the buy offer, and cause the data transport unit to set the channel for sending the data from the provider to the service provider when the matching is established; and an IoT device including a sensor for obtaining the data to be provided by the provider and a device ID holding unit that holds a device ID of the IoT device, the sensor being configured to generate data as the IoT device operates, the provider being an account of the blockchain and providing the data generated by the sensor to the service provider.

The data transaction unit may hold an asset token as an asset ID of the IoT device in the blockchain to be used, the data transport unit may send the data from the IoT device to the service provider, and the data transaction unit may transfer a monetary value corresponding to the data from the service provider to the provider of the IoT device indicated by the asset ID.

The asset token may be an asset token issued with the device ID as an asset ID.

Effects of the Invention

According to the present invention, it is possible to realize a mechanism in which, when. IoT data is generated, the IoT data is automatically converted into a monetary value and the monetary value (currency) is imparted to a provider of the IoT data (an owner of an IoT device).

BRIEF DESCRIPTION OF THE DRAWINGS

FIG. 6 is a screen diagram showing a percentage of revenue sharing of Example 1 in present Embodiment 3;

FIG. 7 is a screen diagram showing a state in which a DO 102 operates during a processing operation of Example 1 in present Embodiment 3;

FIG. 8 is a screen diagram showing a state in which an SP 108 operates during a processing operation of Example 1 in present Embodiment 3.

PREFERRED MODE FOR CARRYING OUT THE INVENTION

Embodiments of the present invention will be described below based on he drawings.

Embodiment 1: IoT Device Based on Basic Principle 1

Figure 1:
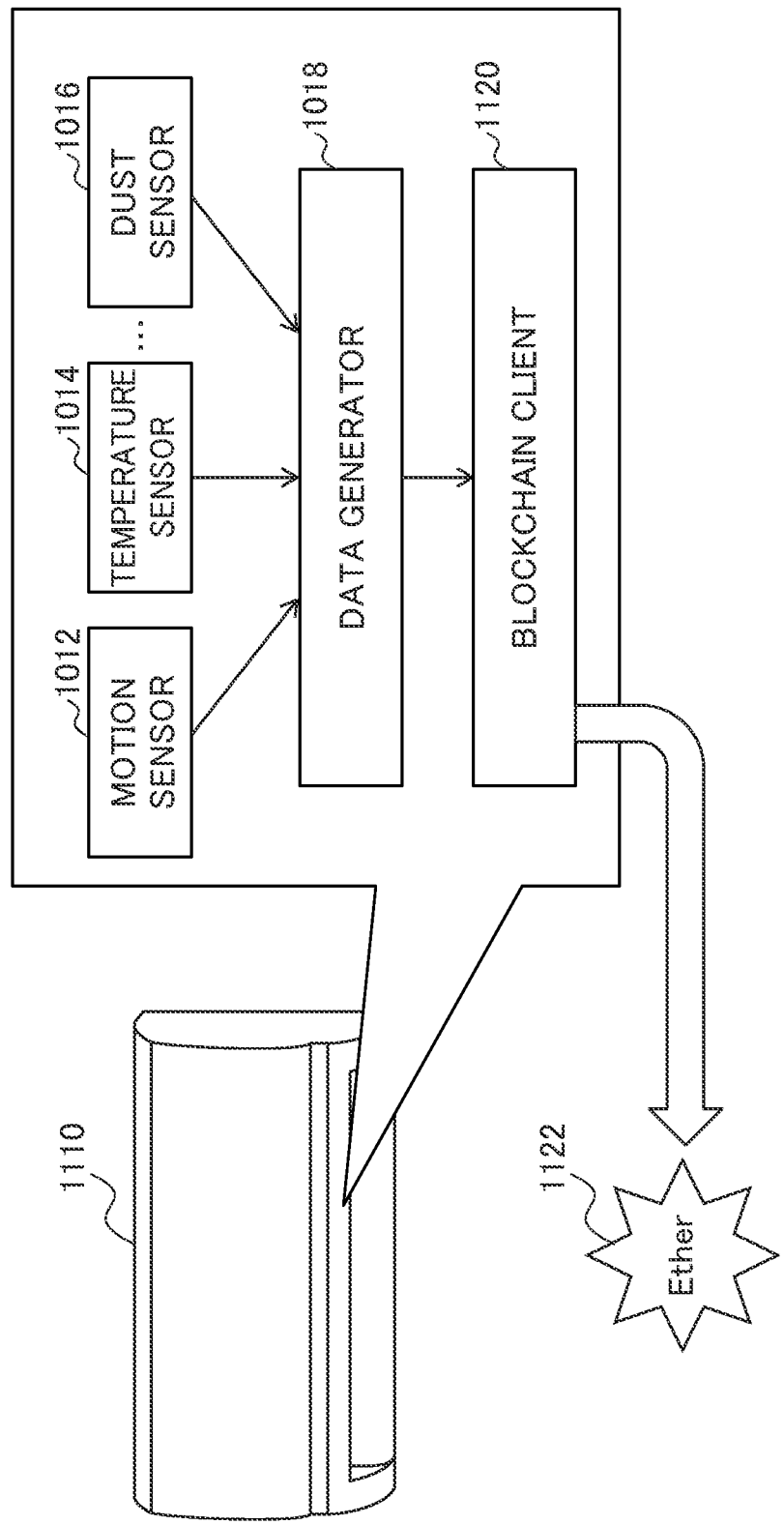
FIG. 1 is a configuration diagram of an IoT device 1110 according to present Embodiment 1.

FIG. 1 shows a configuration of an IoT device 1110 based on Basic Principle 1 described above. As shown in. FIG. 1, the IoT device 1110 may be an air conditioner 1110, for example. Similarly to the conventional IoT device 1010, the IoT device 1110 includes a motion sensor 1012, a temperature sensor 1014, a dust sensor 1016, and a data generator 1018. These components are similar to those of IoT device 1010 described in the background art. The IoT device 1110 shown in FIG. 1 is characterized by including a blockchain client 1120. Then, the IoT device 1110 is characterized by including an account corresponding to the blockchain client 1120. With such a configuration, as described in Principle 1 described above, every time a price is provided to data, which is generated by the data generator 1018, from the IoT device 1110, a monetary value can be put into the account of the blockchain client 1120. In present Embodiment 1, Ether used in Ethereum will be described as an example of the monetary value. Although the Ether will be described as an example in present Embodiment 1, any virtual currency (cryptocurrency) can be used as a monetary value as long as being managed by a blockchain.

Figure 2:
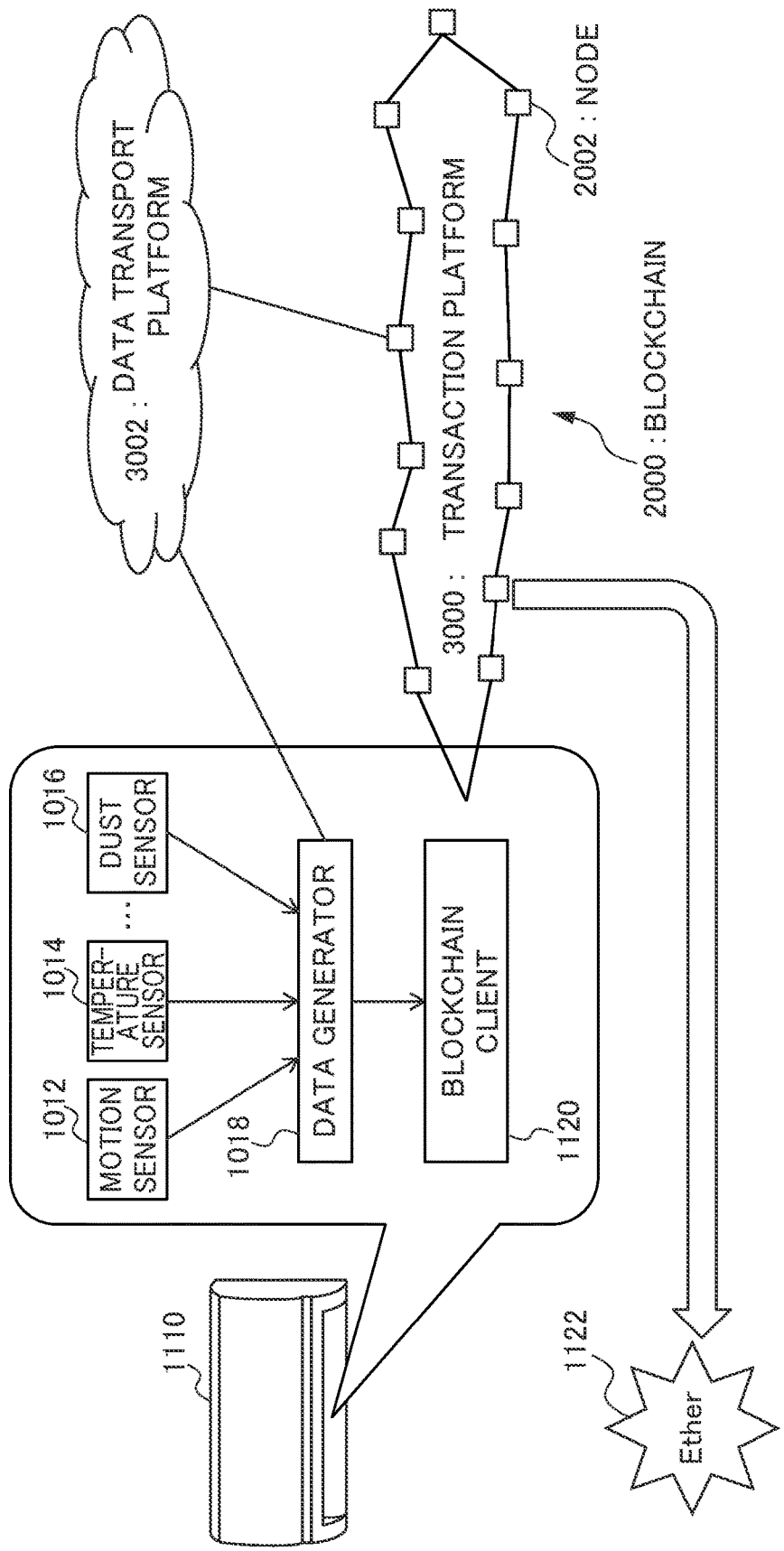
FIG. 2 is an explanatory diagram depicting a mechanism in which a monetary value automatically goes into an account using the IoT device 1110 of present Embodiment 1.

An example of a method of using the IoT device (air conditioner) 1110 is shown in FIG. 2. As shown in FIG. 2, the data generator 1018 of the IoT device 1110 includes a communication interface for providing IoT data to an external device, and is connected to a predetermined data transport unit for flowing the IoT data through the communication interface. The data transport unit may be any communication path. For convenience, the data transport unit is called a data transport platform 3002 in present Embodiment 1. A preferred example of a configuration of the data transport platform 3002 will be described below.

Further, the blockchain client 1120 is a blockchain client 1120 of a blockchain 2000. In FIG. 2, a group of other blockchain clients 2002 (nodes 2002) is also schematically depicted. In present Embodiment 1, the blockchain 2000 is a blockchain 2000 that provides Ethereum which is a platform of a smart contract, and an account (user) of Ethereum can use virtual currency Ether used on the platform. The blockchain client 1120 can also be assigned with an account for managing the Ether, whereby the user of the IoT device can hold the account for managing the virtual currency Ether.

An example of a specific operation is as follows. First, the data generator 1018 acquires IoT data from the motion sensor 1012, the temperature sensor 1014, and the dust sensor 1016. The IoT data acquired by the data generator 1018 is provided to an external device through the communication interface. In present Embodiment 1 (FIG. 2), the destination of the IoT data is called a data transport platform 3002. The data generator 1018 acquires the IoT data, and transmits the IoT data to the external data transport platform 3002. The blockchain client 1120 offers utilization of the IoT data on the blockchain 2000 as such IoT data is generated.

The blockchain 2000 in present Embodiment 1 is a so-called Ethereum platform, and is implemented with a smart contract. As a result, when the use of the IoT data is presented from another account in response to the above-described offer (purchase of IoT data), the smart contract causes the price of IoT data (virtual currency Ether 1122) to go into the account assigned to the blockchain client 1120. At the same time, the smart contract instructs the data transport platform 3002 from a transaction platform 3000 (blockchain 2000) to send the IoT data provided from the data generator 1018 to a purchaser of the IoT data. The data transport platform 3002 sends the IoT data provided from the data generator 1018 to the purchaser based on such an instruction.

In this way, according to present Embodiment 1, it is possible to realize a mechanism in which the IoT data automatically becomes a trading object when the IoT data is generated, and the monetary value automatically enters the owner's account of the IoT device when the purchaser purchases the IoT data.

Embodiment 2: IoT Device Based on Basic Principle 2

Figure 3:
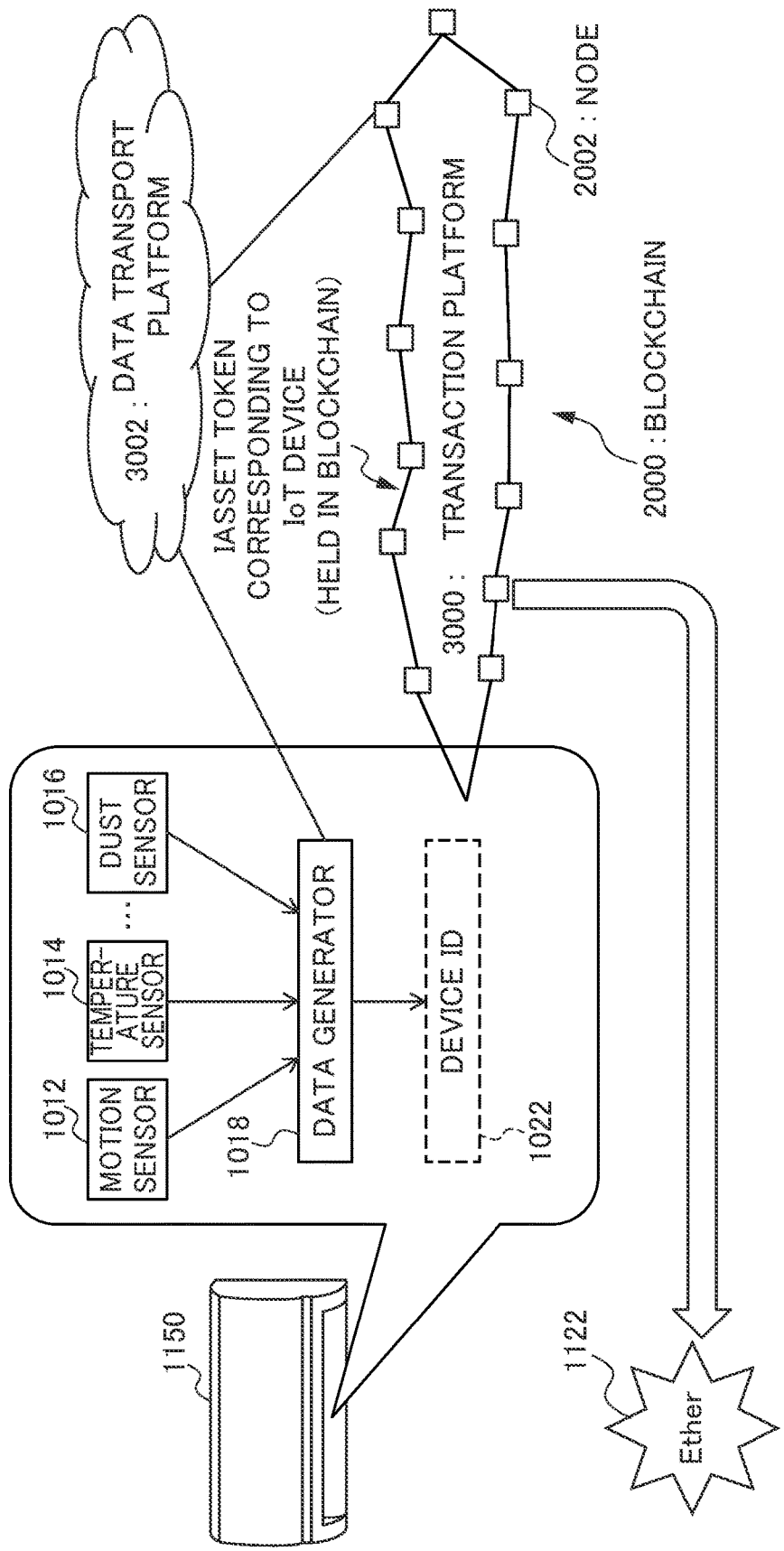
FIG. 3 is an explanatory diagram depicting a mechanism in which a monetary value automatically goes into ac account using an IoT device 1150 of present Embodiment 2.

Next, FIG. 3 shows a diagram showing a configuration and a usage of an IoT device 1150 based on Basic Principle 2 described above. As shown in FIG. 3, the IoT device 1150 has substantially the same configuration as the IoT device 1110 described in FIGS. 1 and 2, but does not include the blockchain client 1120, unlike the IoT device 1110. Alternatively, the IoT device 1150 is assigned (provided) with a device ID 1022. Actually, the IoT device 1150 holds a storage device that stores the device ID. Further, since not being provided with the blockchain client 1120, the data generator 1018 executes an operation different from that of Embodiment. 1 (FIG. 2), as will be described below. Then, as shown in FIG. 3, on a side of the blockchain 2000, an asset token corresponding to the device ID is disposed on the blockchain 2000.

An example of the operation in such a configuration will be described below. First, as in FIG. 2, the data generator 1018 acquires IoT data from the motion sensor 1012, the temperature sensor 1014, and the dust sensor 1016, and the IoT data is provided to the external device through the communication interface. Next, an owner of the IoT device 1150 executes an operation of accessing a transaction platform 3000 configured by the blockchain 2000 and offering provision of the IoT data generated from the IoT device 1150. Here, it is assumed that the owner of the IoT device 1150 has an account for accessing the transaction platform 3000.

The blockchain 2000 in present Embodiment 2 is a so-called Ethereum platform as described above, and is implemented with a smart contract. As a result, when the use of the IoT data (purchase of IoT data) is presented from another account in response to the above-described offer, the smart contract causes the price of IoT data (virtual currency Ether 1122) to go into the account of the owner of the device ID 1022. At the same time, the smart contract instructs the data transport platform 3002 from a transaction platform 3000 (blockchain 2000) to send the IoT data provided from the data generator 1018 to a purchaser of the IoT data. The data transport platform 3002 sends the IoT data provided from the data generator 1018 to the purchaser based on such an instruction.

In this way, according to present Embodiment 2, it is possible to realize a mechanism in which the IoT data automatically becomes a trading object when the IoT data is generated, and the monetary value automatically enters the owner's account of the IoT device when the purchaser purchases the IoT data.

Another Application Example (1) Although the air conditioners are exemplified as the IoT devices 1110 and 1150 in Embodiments 1 and 2 described above, respectively, various other devices can be used. As a result, as described above, it is possible to generally realize the mechanism in which the more IoT data is provided using the IoT device, the more money can be provided to the owner of the IoT device. For example, when the IoT device is a laundry machine, it is preferable to include a dirt sensor that detects how much dirt is removed each time the laundry is done. When data of the dirt sensor is provided to the external device as IoT data, it is possible to realize the laundry machine that allows the owner of the laundry machine to automatically obtain a monetary value each time the laundry is done. Further, for example, when the IoT device is a chair, it is preferable to include a pressure sensor that detects how much load is applied to the chair each time he/she sits on it. When data of the pressure sensor is provided to the external device as IoT data, it is possible to realize the chair that allows the owner of the chair to automatically obtain a monetary value each time he/she sits on it. Further, for example, when the IoT device is a painting, it is preferable to include a camera that detects whether a person in front of the painting has viewed the painting. Surveillance cameras and store surveillance cameras may be provided with such a technology. Therefore, when data of the camera indicating how many times the painting has been viewed is provided to the external device as IoT data, it is possible to realize the painting that allows the owner of the painting to automatically obtain a monetary value each time the painting is viewed.

Embodiment 3: Mechanism for Both Generation and Transference of Value of Information The mechanism has been described in Embodiments 1 and 2 described above in which the value of information (IoT data) is generated and transferred at the same time, but the specific operation thereof is executed by the transaction platform 3000 that contracts the trading of the IoT data and the data transport platform 3002 that receives and sends the IoT data. Present Examples will be described below in which revenue sharing is actually performed in data trading using such a configuration in Example 1. In addition, the applicant has already manufactured and sold the corresponding product for the specific mechanism for realizing the transaction platform 3000 and the data transport platform 3002. Further, the applicant of the present application has already filed a patent application and received a patent registration for the technology related to such a product. For example, a combination mechanism of the transaction platform 3000 and the data transport platform 3002 has been filed by the applicant of the present application in Japanese Patent Application No. 2018-238768, and has been granted Japanese Patent No. 6694048 as a result of examination. Therefore, Japanese Patent No. 6694048 discloses a configuration and operation of a transaction platform (product name: PTPF) and a data transport platform (product name: DEXPF).

3-1. EXAMPLE 1

This Example aims at demonstrating revenue sharing in the data transaction platform 3000. For this reason, Quorum has been used as the data transaction platform. Quorum is a fork chain (branch) of Ethereum, and is a permission-type blockchain in which a function for enterprise has been added. In this Example, the blockchain is configured with seven full nodes of this Quorum, and is used as a data transaction platform 3000. In particular, PTPF, a product of our company, has been used as the data transaction platform in present Example. As a development language, Solidity has been used.

3-1-A. The Following Accounts are Used in Present Example.
(1) Accounts Only for Person
Accounts only for person are as follows.
DO: Device Owner:
An owner of an IoT device.
SP: Service Provider:
A person who uses (purchases) IoT data.
(2) Accounts Between Person and Smart Contract
Accounts between a person and a smart contract are as follows.
AC: Acquirer:
An account that acts for an offer of IoT data.
DB: Data Broker:
An account that acts for a purchase of IoT data.
PTPF: data transaction substrate:
An account that executes transmission and reception of a token, and an account that executes distribution of PTX so as to achieve revenue sharing based on a smart contract.

Figure 5:
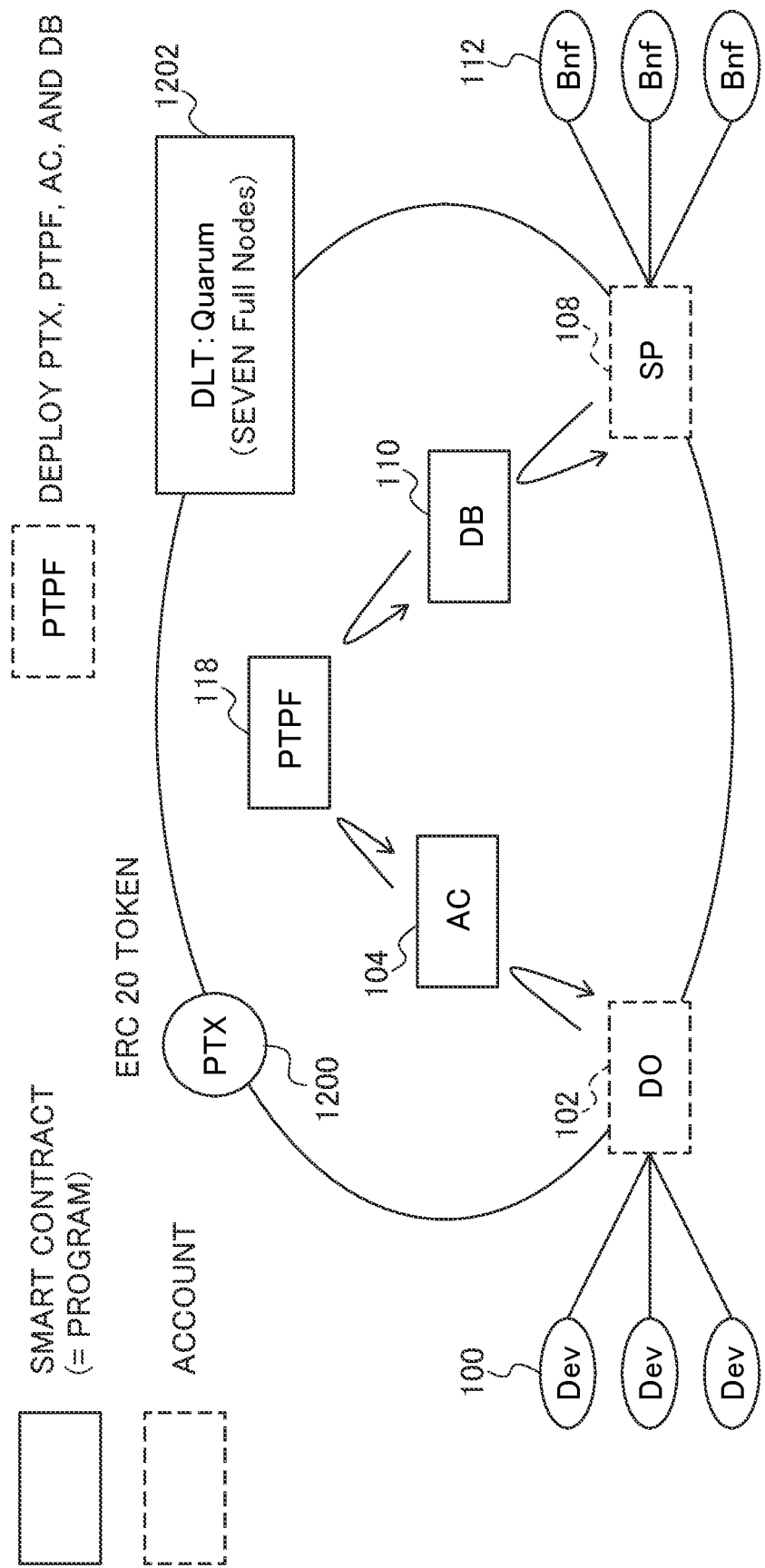
FIG. 5 is a configuration diagram of a data trading system (demonstration system) according to present Embodiment 3.
Figure 9:
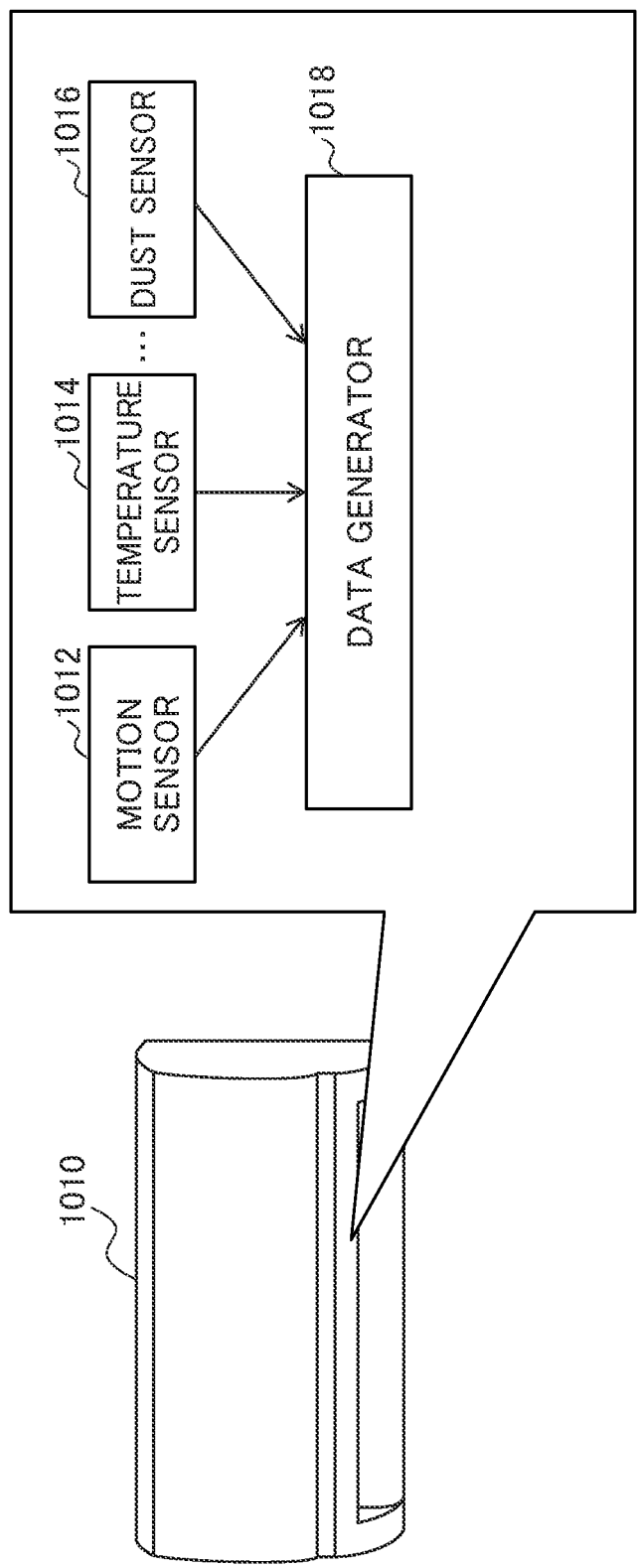
FIG. 9 is a configuration diagram showing a configuration of a conventional IoT device.

FIG. 5 shows a configuration diagram of a data trading system (demonstration system) according to present Example. As shown in FIG. 5, the IoT device is owned by a DO (Device Owner.) 102, and the DO 102 requests an AC 104 to sell IoT data. The AC 104 acts for the selling of the IoT data, and executes a contract of IoT data on the data transaction platform 3000 called a PTPF 118. A counterparty of the contract is a DB 110, and the DB 110 acts on behalf of an SP 108 to purchase the IoT data.

Figure 4:
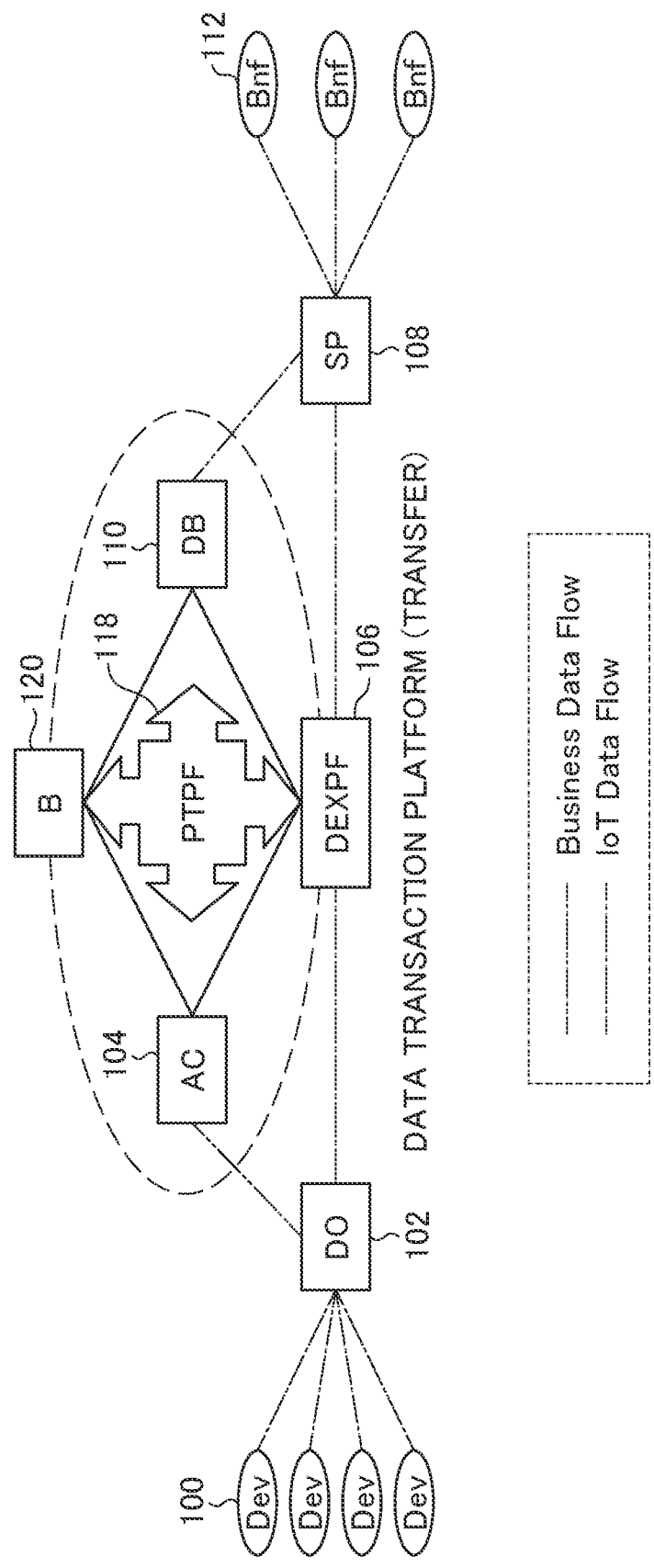
FIG. 4 is a configuration diagram showing an example of realizing a mechanism in which a value of information is generated and transferred using PTPF at the same time.

The PTPF 118 corresponds to a suitable example of the data transaction platform 3000, but is configured by DLT: Quorum (seven Full Nodes) as described above (see FIG. 5). Here, the DLT stands for Distributed Ledger Technology. Although not shown in FIG. 5, an example of the data transport platform 3002 called a DEXPF 106 is connected between the DO 102 and the SP 108 as shown in FIG. 4, and a data transfer is executed as described above.

3-1-B. The Smart Contract Set in Present Example is as Follows (See FIG. 5).

PTX: A smart contract program, which is used as an example to represent monetary value. The PIN may represent, for example, a virtual currency, and is implemented as a token for ERC 20. Here, the ERC is a common standard for smart contracts created for the purpose of enhancing the convenience of the entire development community of Ethereum. Here, the PTX is a token (virtual currency) compliant with the ERC 20. PTPF: A smart contract program, the PTPF executing revenue sharing in present Example. In other words, the data transaction platform executes revenue sharing in present Example. AC: A smart contract program set in an account that acts for the offer to sell the IoT data. In other words, it is a proxy of a seller of the IoT data. DB: A smart contract program set in an account that acts for the purchase of the IoT data. In other words, it is a proxy of a buyer of the IoT data.

3-1-C. In the Demonstration Executed in Present Example, A Series of Processes Including the Following Steps has Been Executed.

STEP 0. In a PTPF account,
Issue PTY token 100 PTX,
Transmit 10 PTX from the PTPF account to the DO account (seller of IoT data).
Transmit 10 PTX from the PTPF account to the SP account (buyer of IoT data).
STEP 1. Describe a percentage of revenue shared in a revenue sharing execution program of the PTPF.
The percentage of revenue shared is as follows.
Value of data: PTX token 1
Percentage of revenue shared: PTPF 30%, AC 20%, DB 10% DO 40%, SP 0 (zero) %

Here, an example of distributing a value according to the percentage of the revenue shared is described, but a fixed money amount may also be used. For example, it may be a fixed value without a percentage, such as "10 PTX for one instance of data supply". In this way, both the case of distributing the value to the account at the percentage and the case of distributing it at the fixed value (fixed money amount) are equivalent to a suitable example of a "revenue ratio" in claims. For example, the revenue ratio represents a distribution method, but an account represented by the percentage of revenue shared and an account represented by the fixed value may exist together. Further, the percentage of revenue shared may include a case of 0 (zero) (no assignment) (see the above-described SP).

STEP 2. AC/DB executes trading of IoT data.
AC: Sell "data name: TEST" at a value "PTX1".
DB: Buy "data name: TEST" at a value "PTX1".
STEP 3. A PTPF program executes revenue sharing at the same time of establishment of a contract.
As a result, PTX moves to each of the accounts of PTPF, AC, DB, DO, and SP according to each percentage.

3-1-D. Revenue Sharing Amount

The PTPF 118, AC 104, and DB 110 can share the revenue according to the percentage of revenue shared with respect to the amount of trading money (PTX1). Results of present Example are shown in FIG. 6. FIG. 6 shows a screen of a terminal that controls the PTPF 118. As shown in FIG. 6, when the contract is established, a distribution of a PTX 1200 is executed by the PTPF 118. This is because a smart contract (program) is set on the PTPF 118. In present. Example, such a smart contract is implemented on the smart contract platform called DLT: Quorum, but other smart contract platforms may be used.

Next, PTX values of trading parties will be described on the screen of the terminal that controls each of the values. FIG. 7 shows a screen of the DO 102, which is a seller of IoT data, when the processing operation in present. Example 1 is executed. As shown in FIG. 7, in part A, an operator first examines the account of the DO 102. Then, the operator can confirm that the terminal displays that the PTX held by the DO 102 is 10, as shown in part B. As described above, this is the result of transmission of 10 PTX from the PTPF 118 to the account of the DO 102 in STEP 0. In this way, it is possible to know the balance and current deposit amount, so to speak. Next, the operator proceeds with the processing of present Example to execute the trading. In part C of FIG. 7, a price (a value of data) is set to "1". As a result, 0.4 being 40% (see STEP 1 described above) of the price is transferred to the DO 102. As a result, the holding amount of the DO 102 is 10.4 PTX, as shown in part D.

FIG. 8 shows a screen of the SP 108, which is a buyer of IoT data, when the processing operation in present Example 1 is executed. As shown in FIG. 8, in part E, an operator first examines the account of the SP 108. Then, the operator can confirm that the terminal displays that the PTX held by the SP 108 is 10, as shown in part F. As described above, this is the result of transmission of 10 PTX from the PTPF 118 to the account of the SP 108 in STEP 0. In this way, it is possible to know the balance and current deposit amount, so to speak. Next, the operator proceeds with the processing of present Example to execute the trading. In part C of FIG. 7, a price (a value of data)) is set to "1". As a result, the SP 108 transmits the price "1 PTX" to the PTPF account. As a result, the holding amount of the SP 108 is 9.0 PTX, as shown in part D.

As described above, in present Example 1, from the 1 PTX paid by the SP 108, the DO 102 acquires 0.4 PTX, which is 40% thereof, and the PIPS 118 acquires 0.3 PTX, which is 30% thereof. Further, the AC 104 acquires 0.2 PTX, which is 20% thereof, and the DB 110 acquires 0.1 PTX, which is 110% thereof. In this way, an example has been described in present Example in which the monetary value is distributed between the accounts at the percentage of revenue shared, but other charge methods may be adopted depending on the type of business and the type of IoT data, and other distribution methods may be adopted as appropriate in this case. Such a distribution method can be set in a smart contract. For example, depending on the type of business, the fee may be defined as a fixed money amount per transmission of IoT data. In the case of the type of business, for example, it may be distributed at a fixed value instead of the percentage of revenue shared. Both the case of distributing the value at the percentage and the case of distributing it at the fixed value may be included in the "revenue ratio" in claims. Further, the revenue ratio may also include other distribution methods. For example, the "revenue ratio" may include a case where the fee is determined stepwise according to the amount of IoT data. As described above, according to present Example 1, the PTPF 108 accommodates the smart contract (program) in which the revenue ratio is set in advance, and thus the revenue sharing can be automatically realized at once.

Although embodiments of the present invention have been described above, the present invention is not limited to the above-described embodiments. Moreover, the effects described in the present embodiments are merely enumerations of the most suitable effects resulting from the present invention, and the effects of the present invention are not limited to those described in the present embodiments.

EXPLANATION OF REFERENCE NUMERALS

10 . . . PF
12 . . . GW
14 . . . device
20 . . . R
22 . . . GW
24 . . . device
100 . . . device
102 . . . DO
104 . . . AC
106 . . . DEXPF
108 . . . SP
110 . . . DB
112 . . . Bnf
114 . . . B
116 . . . PtDX
118 . . . PTPF
120 . . . B
130 . . . Token (XPT)
132 . . . Public Blockchain PF
200 . . . blockchain
300 . . . DM
302 . . . DP
400 . . . PD Exchange
402 . . . Channel Mapper
404 . . . API for IoT Devices
406 . . . API for IoT Applications
408 . . . API for IoT Management
410 . . . IoT Devices
412 . . . IoT Applications
414 . . . Management Toolbelt
1010 . . . IoT device (air conditioner)
1012 . . . motion sensor
1014 . . . temperature sensor
1016 . . . dust sensor
1018 . . . data generator
1022 . . . device ID
1110 . . . IoT device
1120 . . . blockchain client (node)
1122 . . . currency (Ether)
1150 . . . IoT device
1200 . . . PTX
1202 . . . DLT: Quorum
2000 . . . blockchain
2002 . . . node
3000 . . . transaction platform
3002 . . . data transport platform

The invention claimed is:

1. A data trading system capable of functioning as an IoT data trading system, comprising:
a data transport unit capable of, under control from an external device, setting a channel for data and sending the data to a predetermined recipient;
a data transaction unit that preserves and manages a smart data trading contract using a blockchain and executes the smart data trading contract; and
an IoT device that provides IoT data, the IoT device including:
one or more sensors that generate IoT data;
a data generator that acquires data generated by the one or more sensors and provides the data to an external device; and a device-side blockchain client for the blockchain,
wherein:
the data transaction unit has two or more accounts for trading the IoT data, and executes the smart data trading contract between the accounts,
the IoT device has an account in the data transaction unit,
the data generator sends the IoT data to the data transport unit,
the account of the IoT device sends a sell offer of the IoT data to the data transaction unit as such the IoT data is generated,
the data transaction unit instructs the data transport unit to send, based on a buy offer of the IoT data issued from a predetermined account and the sell offer issued from the account of the IoT device, the IoT data from the IoT device to a service provider which owns the account from which the buy offer has been issued, and imparts a monetary value of the sent IoT data to the account of the IoT device, and
upon generation of the IoT data, the data transaction unit automatically converts the IoT data into the monetary value.

2. The data trading system according to claim 1, further comprising:
an acquisition unit that issues a sell offer of data to the data transaction unit on behalf of an owner of the IoT device, the acquisition unit having an account in the data transaction unit; and
a data broker that issues a buy offer of data to the data transaction unit on behalf of a service provider that utilizes the data, the data broker having an account in the data transaction unit, wherein
the data transaction unit instructs the data transport unit to send, based on a buy offer of the IoT data issued from the account of the data broker and the sell offer issued from the account of the acquisition unit, the IoT data from the IoT device to the service provider, on behalf of which the data broker has issued the buy offer from the account of the data broker, and distributes and imparts a monetary value of the sent IoT data to the account of the IoT device, the account of the acquisition unit, the account of the data broker, and the account of the data transaction unit at a predetermined revenue ratio.

3. A data trading system capable of functioning as an IoT data trading system, comprising:
a data transport unit capable of, under control from an external device, setting a channel for data and sending the data to a predetermined recipient;
a data transaction unit that preserves and manages a smart data trading contract using a blockchain and executes the smart data trading contract; and
an IoT device that provides IoT data, the IoT device including:
one or more sensors that generate IoT data;
a data generator that acquires data generated by the one or more sensors and provides the data to an external device; and
a device ID storage unit that stores a device ID of the IoT device,
wherein:
the data transaction unit holds an asset token corresponding to the device ID,
the data generator sends the IoT data generated by the sensors to the data transport unit,
an account of an owner of the asset token sends a sell offer of the IoT data to the data transaction unit as such the IoT data is generated,
the data transaction unit instructs the data transport unit to send, based on a buy offer of the IoT data issued from a predetermined account and the sell offer, the IoT data from the IoT device to the account from which the buy offer has been issued, and imparts a monetary value of the sent IoT data to the account of the owner of the asset token existing in the data transaction unit, and
upon generation of the IoT data, the data transaction unit automatically converts the IoT data into the monetary value.

4. The data trading system according to claim 3, further comprising:
an acquisition unit that issues a sell offer to the data transaction unit on behalf of an owner of the IoT device, the acquisition unit having an account in the data transaction unit; and
a data broker that issues a buy offer of data to the data transaction unit on behalf of a service provider that utilizes the data, the data broker having an account in the data transaction unit, wherein
the data transaction unit instructs the data transport unit to send, based on a buy offer of the IoT data issued from the account of the data broker and the sell offer issued from the account of the acquisition unit, the IoT data from the IoT device to the service provider, on behalf of which the data broker has issued the buy offer from the account of the data broker, and distributes and imparts a monetary value of the sent IoT data to the account of the owner of the asset token existing in the data transaction unit, the account of the acquisition unit, the account of the data broker, and the account of the data transaction unit at a predetermined revenue ratio.

5. A data trading system comprising:
a data transport unit capable of, under control from an external device, setting a channel for data and sending the data to a predetermined recipient;
a data transaction unit that preserves and manages a smart data trading contract using a blockchain and executes the smart data trading contract;
an acquisition unit that issues a sell offer of data to the data transaction unit for a provider that provides data;
a data broker that issues a buy offer of data to the data transaction unit for a service provider that utilizes data,
the data transaction unit being configured to perform condition matching on the sell offer and the buy offer, and cause the data transport unit to set the channel for sending the data from the provider to the service provider when the matching is established; and
an IoT device including the provider and a sensor for obtaining the data to be provided by the provider,
the sensor being configured to generate data as the IoT device operates, the provider being an account of the blockchain and being configured to provide the data generated by the IoT device to the service provider, and
upon generation of the IoT data, the data transaction unit being configured to automatically convert the IoT data into a monetary value.

6. The data trading system according to claim 5, wherein
the provider has an account that holds a monetary value,
the service provider also has an account that holds a value,
the data transport unit sends the data from the provider to the service provider, and the data transaction unit transfers the automatically converted monetary value corresponding to the data from the service provider to the provider.

7. The data trading system according to claim 6, wherein the IoT device is one selected from an electrical appliance, a mobile communication device, and an industrial machine.

8. The data trading system according to claim 6, wherein the monetary value is one selected from a virtual currency, a cryptocurrency, and electronic money.

9. The data trading system according to claim 6, wherein the monetary value is a cryptocurrency managed by the blockchain of the data transaction unit.

10. A data trading system comprising:
a data transport unit capable of, under control from an external device, setting a channel for data and sending the data to a predetermined recipient;
a data transaction unit that preserves and manages a smart data trading contract using a blockchain and executes the smart data trading contract;
an acquisition unit that issues a sell offer to the data transaction unit for a provider that provides data;
a data broker that issues a buy offer of data to the data transaction unit for a service provider that utilizes data,
the data transaction unit being configured to perform condition matching on the sell offer and the buy offer, and cause the data transport unit to set the channel for sending the data from the provider to the service provider when the matching is established; and
an IoT device including a sensor for obtaining the data to be provided by the provider and a device ID holding unit that holds a device ID of the IoT device,
the sensor being configured to generate data as the IoT device operates, the provider being an account of the blockchain and being configured to provide the data generated by the sensor to the service provider, and
upon generation of the IoT data, the data transaction unit being configured to automatically convert the IoT data into a monetary value.

11. The data trading system according to claim 10, wherein
the data transaction unit holds an asset token as an asset ID of the IoT device in the blockchain to be used,
the data transport unit sends the data from the IoT device to the service provider, and
the data transaction unit transfers the monetary value corresponding to the data from the service provider to the provider of the IoT device indicated by the asset ID.

12. The data trading system according to claim 11, wherein
the asset token is an asset token issued with the device ID as an asset ID.

13. The IoT device that provides IoT data to the data trading system according to claim 1, comprising:
one or more sensors that generate IoT data;
a data generator that acquires data generated by the one or more sensors and provides the data to an external device;
a device-side blockchain client for the blockchain; and
an account in the data transaction unit,
wherein:
the data generator sends the IoT data generated by the sensors to the data transport unit,
the account of the IoT device sends a sell offer of the IoT data to the data transaction unit as such the IoT data is generated, and
the account of the IoT device receives a monetary value of the sent IoT data from the data transaction unit.

14. The IoT device that provides IoT data to the data trading system according to claim 3, comprising:
one or more sensors that generate IoT data;
a data generator that acquires data generated by the one or more sensors and provides the data to an external device; and
a device ID storage unit that stores a device ID of the IoT device,
wherein:
the data transaction unit holds an asset token corresponding to the device ID,
the data generator sends the IoT data generated by the sensors to the data transport unit, and
the data transaction unit imparts a monetary value of the sent IoT data to the account of the owner of the asset token corresponding to the device ID, existing in the data transaction unit.

15. The IoT device that provides IoT data to the data trading system according to claim 5, comprising:
the provider;
a sensor for obtaining the data to be provided by the provider, the sensor being configured to generate data as the IoT device operates.

16. The IoT device that provides IoT data to the data trading system according to claim 10, comprising:
a sensor for obtaining the data to be provided by the provider; and
a device ID holding unit that holds a device ID of the IoT device, the sensor being configured to generate data as the IoT device operates.

* * * * *